United States Patent
Tang et al.

(10) Patent No.: US 12,203,403 B2
(45) Date of Patent: Jan. 21, 2025

(54) FILTER CATALYZED WITH SCR CATALYST, SYSTEMS AND METHODS

(71) Applicant: BASF CORPORATION, Florham Park, NJ (US)

(72) Inventors: Weiyong Tang, East Brunswick, NJ (US); Sanath V. Kumar, Hillsborough, NJ (US); Kevin A. Hallstrom, Clinton, NJ (US); David M. Youngren, West Milford, NJ (US); Kenneth E. Voss, Somerville, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 0 days.

(21) Appl. No.: 15/552,305

(22) PCT Filed: Mar. 18, 2016

(86) PCT No.: PCT/US2016/023103
§ 371 (c)(1),
(2) Date: Aug. 21, 2017

(87) PCT Pub. No.: WO2016/149606
PCT Pub. Date: Sep. 22, 2016

(65) Prior Publication Data
US 2018/0045097 A1  Feb. 15, 2018

Related U.S. Application Data

(60) Provisional application No. 62/135,657, filed on Mar. 19, 2015.

(51) Int. Cl.
*F01N 3/20* (2006.01)
*B01D 53/94* (2006.01)
*B01J 29/072* (2006.01)
(Continued)

(52) U.S. Cl.
CPC ......... *F01N 3/208* (2013.01); *B01D 53/9418* (2013.01); *B01D 53/944* (2013.01);
(Continued)

(58) Field of Classification Search
CPC ........ F01N 3/035; F01N 3/2066; F01N 3/208; F01N 13/009; F01N 13/0093;
(Continued)

(56) References Cited

U.S. PATENT DOCUMENTS

| 4,963,332 | A | 10/1990 | Brand et al. |
| 5,522,218 | A | 6/1996 | Lane et al. |

(Continued)

FOREIGN PATENT DOCUMENTS

| EP | 2597279 A1 | 5/2013 |
| WO | 2010/075345 A2 | 7/2010 |

OTHER PUBLICATIONS

"Nonroad Diesel Engines," DieselNet, archived as early as Mar. 28, 2008, https://dieselnet.com/standards/us/nonroad.php (Year: 2008).*

(Continued)

*Primary Examiner* — Audrey B. Walter
(74) *Attorney, Agent, or Firm* — DLA Piper LLP (US)

(57) ABSTRACT

Provided are catalyst articles, methods and systems for treating lean burn engine exhaust. Catalyst articles include selective catalytic reduction catalyst on a particulate filter. The SCR catalyst on the particulate filter provides limited NOx conversion so that unconverted $NO_2$ is available to facilitate passive oxidation of soot trapped on the particulate filter by reaction with $NO_2$. Systems and methods utilize such catalytic articles, and further include, e.g., a downstream selective catalytic reduction catalyst on a flow through substrate.

4 Claims, 5 Drawing Sheets

(51) Int. Cl.
  *B01J 29/76* (2006.01)
  *B01J 35/00* (2006.01)
  *B01J 35/56* (2024.01)
  *B01J 37/02* (2006.01)
  *F01N 3/035* (2006.01)

(52) U.S. Cl.
  CPC ........ *B01D 53/9477* (2013.01); *B01J 29/072* (2013.01); *B01J 29/76* (2013.01); *B01J 29/763* (2013.01); *B01J 35/19* (2024.01); *B01J 35/56* (2024.01); *B01J 37/0246* (2013.01); *F01N 3/035* (2013.01); *B01D 2255/50* (2013.01); *B01D 2255/9155* (2013.01); *B01D 2257/404* (2013.01); *B01D 2258/012* (2013.01); *B01J 2229/18* (2013.01); *F01N 2570/14* (2013.01); *F01N 2610/02* (2013.01); *Y02A 50/20* (2018.01); *Y02T 10/12* (2013.01)

(58) Field of Classification Search
  CPC ............ F01N 2610/02; B01D 53/9418; B01D 2255/50; B01D 2255/9155; B01J 29/072; B01J 29/76; B01J 29/763; B01J 35/04; B01J 37/0246
  See application file for complete search history.

(56) References Cited

U.S. PATENT DOCUMENTS

| | | |
|---|---|---|
| 6,415,602 B1 | 7/2002 | Patchett et al. |
| 7,799,289 B2 | 9/2010 | Robel |
| 2005/0069476 A1* | 3/2005 | Blakeman .......... B01D 53/9431 423/239.1 |
| 2007/0274889 A1 | 11/2007 | Nakatsuji et al. |
| 2008/0229731 A1 | 9/2008 | Kikuhara et al. |
| 2010/0058746 A1* | 3/2010 | Pfeifer ............... B01D 53/9468 60/297 |
| 2010/0180580 A1 | 7/2010 | Boorse et al. |
| 2010/0269491 A1* | 10/2010 | Boorse .................... F01N 3/022 60/299 |
| 2011/0064632 A1* | 3/2011 | Huang ............... B01D 53/9477 423/212 |
| 2011/0113761 A1 | 5/2011 | Boorse et al. |
| 2012/0258032 A1 | 10/2012 | Phillips et al. |
| 2013/0029838 A1 | 1/2013 | Aoki et al. |
| 2014/0112852 A1 | 4/2014 | Mohanan et al. |
| 2014/0255284 A1 | 9/2014 | Alden et al. |
| 2014/0322114 A1 | 10/2014 | Jen et al. |
| 2015/0020506 A1* | 1/2015 | Johansen ............... B01D 53/90 60/274 |
| 2015/0231564 A1* | 8/2015 | Wittrock ............... F01N 13/009 422/171 |
| 2015/0283507 A1 | 10/2015 | Schraml et al. |

OTHER PUBLICATIONS

International Search Report dated Jun. 21, 2016.
International Search Report and Written Opinion for PCT Patent Application No. PCT/US2016/023103, Issued on Jul. 12, 2016, 19 pages.
European Search Report for EP Patent Application No. 16765816.0, Issued on Oct. 12, 2018, 3 pages.

* cited by examiner

FILTER CATALYZED WITH SCR CATALYST, SYSTEMS AND METHODS

This application is a national stage of PCT/US2016/23103, filed Mar. 18, 2016 which takes the benefit of U.S. Provisional application No. 62/135,657 filed Mar. 19, 2015 the contents of which are incorporated entirely by reference.

TECHNICAL FIELD OF THE INVENTION

The present invention relates to catalyst articles, emission treatment systems, and methods of treating exhaust gas.

BACKGROUND OF THE INVENTION

Engine exhaust and in particular, diesel engine exhaust is a heterogeneous mixture which contains not only gaseous emissions such as carbon monoxide ("CO"), unburned hydrocarbons ("HCs") and nitrogen oxides ("$NO_x$"), but also condensed phase materials (liquids and solids) which are generally referred to as particulates or particulate matter (PM). All of these species (CO, HCs, $NO_x$, and PM) are regulated species of exhaust emissions.

Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of NOx.

Oxidation catalysts that contain platinum group metals, base metals and combinations thereof are known to facilitate the treatment of diesel engine exhaust by promoting the conversion of both HC and CO gaseous pollutants and some proportion of the PM through oxidation of these pollutants to carbon dioxide and water. Such catalysts have generally been contained in units called diesel oxidation catalysts (DOCs), which are placed in the exhaust stream of diesel engines to treat the exhaust before it vents to the atmosphere.

In addition to the conversions of gaseous HC, CO and PM, oxidation catalysts that contain platinum group metals (which are typically dispersed on a refractory oxide support) also promote the oxidation of nitric oxide (NO) to $NO_2$.

The total particulate matter (TPM) emissions of diesel exhaust are comprised of three main components. One component is the dry, solid carbonaceous fraction or soot fraction. This dry carbonaceous matter contributes to the visible soot emissions commonly associated with diesel exhaust.

A second component of the TPM is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C., in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel and lubricating oil. During combustion the sulfur components of the diesel fuel and oil form gaseous $SO_2$ and $SO_3$. As the exhaust cools $SO_3$ combines rapidly with water to form sulfuric acid, $H_2SO_4$. The sulfuric acid forms an aerosol that collects as a condensed phase with the carbon particulates, or is adsorbed onto the other particulate components, and thereby adds to the mass of TPM.

One key after-treatment technology in use for high particulate matter reduction is the diesel particulate filter (DPF). There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the solid carbonaceous particulate material from diesel exhaust. The filter is a physical structure for removing particles from exhaust, and the accumulating particles will increase the back pressure from the filter on the engine. Thus the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than what is typically present in diesel exhaust.

Provisions are generally introduced to increase exhaust temperature in order to provide for active regeneration of the filter. The presence of a catalyst provides for CO, HC and NO oxidation within the filter and an increase in the rate of soot combustion. In this way, a catalyzed soot filter (CSF) or catalyzed diesel particulate filter (CDPF) is effective in providing for >90% particulate matter reduction along with active burning of the accumulating soot.

Another mechanism for the removal of particles is through the use of $NO_2$ in the exhaust stream as an oxidant. Thus, particulates may be removed by oxidation employing $NO_2$ as an oxidant at temperatures above 300° C. The $NO_2$ already in the exhaust from the engine may additionally be supplemented through oxidation of NO also in the exhaust through the use of an upstream DOC oxidation catalyst. This passive regeneration mechanism can further reduce the soot load in a filter and decrease the number of active regeneration cycles.

Future emissions standards adopted throughout the world will also address NOx reductions from diesel exhaust. Various methods have been used in the treatment of NO-containing gas mixtures. One type of treatment involves catalytic reduction of nitrogen oxides. There are two processes: (1) a nonselective reduction process wherein carbon monoxide, hydrogen, or a lower hydrocarbon is used as a reducing agent, and (2) a selective reduction process wherein ammonia or an ammonia precursor is used as a reducing agent. In the selective reduction process, a high degree of removal with nitrogen oxide can be obtained with a small amount of reducing agent.

The selective reduction process is referred to as a SCR process (Selective Catalytic Reduction). The SCR process uses catalytic reduction of nitrogen oxides with ammonia in the presence of atmospheric oxygen with the formation predominantly of nitrogen and steam:

$$4NO + 4NH_3 + O_2 \rightarrow 4N_2 + 6H_2O \text{ (standard SCR reaction)}$$

$$2NO_2 + 4NH_3 \rightarrow 3N_2 + 6H_2O \text{ (slow SCR reaction)}$$

$$NO + NO_2 + NH_3 \rightarrow 2N_2 + 3H_2O \text{ (fast SCR reaction)}$$

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

SCR for mobile applications uses urea (typically present in an aqueous solution) as the source of ammonia. SCR provides efficient conversions of NOx as long as the exhaust temperature is within the active temperature range of the catalyst.

Coated soot filters that can achieve NOx reduction goals require a sufficient loading of SCR catalyst composition on the soot filter. The gradual loss of the catalytic effectiveness of the compositions that occurs over time through exposure to certain deleterious components of the exhaust stream augments the need for higher catalyst loadings of the SCR catalyst composition.

One of the fundamental problems with providing SCR catalyst on a filter is that the filter must provide at least two functions simultaneously, the oxidation of soot trapped on the filter and the reduction of $NO_x$ via selective catalytic reduction. Both the SCR of $NO_x$ and oxidation of soot are dependent on $NO_2$, thus two reactions compete for available $NO_2$. If the SCR reaction dominates in the filter, soot will accumulate on the filter, causing an unacceptable increase in backpressure, limiting efficient operation of the vehicle. There is a need to provide catalyst articles, methods and system which can efficiently remove NOx and particulate from lean burn engine exhaust.

SUMMARY OF THE INVENTION

Various embodiments are listed below. It will be understood that the embodiments listed below may be combined not only as listed below, but in other suitable combinations in accordance with the scope of the invention.

A first aspect pertains to a vehicle emission system for removing $NO_x$ and particulates from the exhaust gas of a lean burn engine, the system comprising: a catalyst which oxidizes NO to form $NO_2$; a first ammonia selective catalytic reduction (SCR) catalyst disposed on a particulate filter, the first ammonia SCR catalyst having a characteristic designed to both limit $NO_x$ conversion and facilitate passive oxidation of soot trapped by the particulate filter; and a second ammonia SCR catalyst downstream from the first ammonia SCR catalyst disposed on a flow through substrate designed to promote SCR of $NO_x$.

A second aspect pertains to a vehicle emission system for removing $NO_x$ and particulates from the exhaust gas of a lean burn engine, the system comprising: a catalyst which oxidizes NO to form $NO_2$; a first ammonia selective catalytic reduction (SCR) catalyst disposed on a particulate filter, the first ammonia SCR catalyst having a characteristic designed to retard the SCR activity on the particulate filter to enable passive soot regeneration on the filter; and a second ammonia SCR catalyst downstream from the first ammonia SCR catalyst disposed on a flow through substrate designed to promote SCR of $NO_x$.

A third aspect pertains to a method of treating lean burn engine exhaust gas containing $NO_x$ and particulate matter, the method comprising: contacting the exhaust gas with a catalyst which oxidizes NO to form $NO_2$ to provide an exhaust gas stream containing an enhanced amount of $NO_2$; contacting the exhaust gas having an enhanced amount of $NO_2$ with first ammonia selective catalytic reduction (SCR) catalyst disposed on a particulate filter, wherein the first ammonia SCR catalyst is designed to limit SCR activity and to facilitate passive soot oxidation on the particulate filter by reaction with $NO_2$; and contacting the exhaust gas exiting the particulate filter with a second ammonia SCR catalyst on a flow through substrate downstream from particulate filter.

According to one or more embodiments, the SCR catalyst characteristic of the first ammonia SCR catalyst is selected from one or more of SCR catalyst type, combinations of SCR catalyst types, SCR catalyst loading, SCR catalyst concentration, axial location of the SCR catalyst on the particulate filter, local loading of the SCR catalyst on the particulate filter, length of the SCR catalyst coating on the filter, SCR catalyst promoter metal selection, SCR catalyst promoter metal content, SCR catalyst washcoat porosity, SCR catalyst washcoat pore distribution, SCR catalyst particle size and SCR catalyst crystal size. One or more of these catalyst characteristics is modified in a way to provide targeted NOx reduction in the particulate filter so that passive soot oxidation on the particulate filter by reaction with $NO_2$.

BRIEF DESCRIPTION OF THE DRAWINGS

Further features of embodiment of the present invention, their nature and various advantages will become more apparent upon consideration of the following detailed description, taken in conjunction with the accompanying drawings, which are also illustrative of the best mode contemplated by the applicants, and in which like reference characters refer to like parts throughout, where.

DETAILED DESCRIPTION OF THE INVENTION

Figure 1:
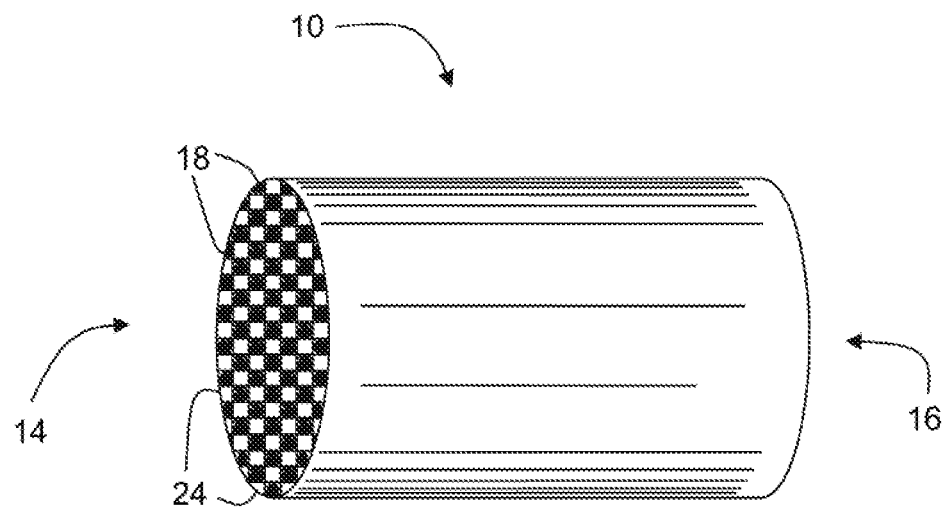
FIG. 1 illustrates an external view of an embodiment of a wall flow filter substrate having an inlet end and an outlet end.

Before describing several exemplary embodiments of the invention, it is to be understood that the invention is not limited to the details of construction or process steps set forth in the following description. The invention is capable of other embodiments and of being practiced or being carried out in various ways. Reference throughout this specification to "one embodiment," "certain embodiments," "various embodiments," "one or more embodiments" or "an embodiment" means that a particular feature, structure, material, or characteristic described in connection with the embodiment may be included in at least one embodiment of the invention. Thus, the appearances of the phrases such as "in one or more embodiments," "in certain embodiments," "in various embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

As used herein, the term "permeate" when used to describe the dispersion of SCR catalyst and/or oxidation catalyst into the porous walls of a substrate (e.g., filter), means that the particular composition penetrates into at least a majority of the hollow regions within the wall thickness, and becomes deposited on the internal surfaces throughout the thickness of the walls. In this manner, the material becomes dispersed throughout the wall of the substrate (e.g., filter).

As used herein, the term "local loading" when used to describe the amount of catalytic material (e.g., PGM, SCR catalyst, oxidation catalyst) present on the porous walls, means the average amount of catalytic material deposited on the walls within the particular zone or zones, that is, the indicated loading is not averaged over the entire length of the substrate.

As used herein, a washcoat loading is defined in $g/in^3$, as the total weight of all washcoat components (i.e., PGM, refractory metal oxide support, zeolite, base metals, OSC, etc.) per unit volume of the monolithic substrate. PGM loading is defined in $g/ft^3$, as the total weight of all PGM metals in the catalyst (e.g., Pt+Pd+Rh) per unit volume of the monolithic substrate. Therefore, TWC, DOC, CSF and LNT catalysts that use PGM may be uniquely described with both washcoat loading and PGM loading, while SCR catalysts that do not have a PGM component may be described by only the washcoat loading. AMOx catalysts that have both SCR and PGM components may be described by both criteria. As used herein, "loading" for the PGM catalyst is the actual weight of PGM affixed to the internal and external surfaces of the porous wall(s) after the wash coat is applied, whereas "loading" for the SCR catalyst is the actual combined weight of metal promotor and molecular sieve material affixed to the internal and external surfaces of the porous wall(s) after the wash coat is applied. In addition, a localized PGM or washcoat loading may be used to specifically describe the weight/volume of the catalyst components in the specific catalyst zone.

Catalyst loadings as presented herein may refer to catalyst loadings within a particular zone on a substrate or along the entire length of a substrate. Accordingly, it is to be understood that a given catalyst loading or range of catalyst loadings, when referring to a substrate "comprising" a given catalyst, can encompass both scenarios. Useful catalyst loadings, e.g., to achieve or modify the desired or target NOx conversion on an SCR catalyst can thus be dependent on the length of substrate coated with that catalyst. Accordingly, in some embodiments, higher loadings may be useful where the length of substrate coated with a given catalyst is lower (e.g., in a zoned structure) to achieve the same NOx conversion as achieved over a substrate fully coated with that catalyst. As such, the catalysts disclosed herein can be provided in a wide range of loadings (e.g., including, but not limited to, from about 0.01 to about 6 $g/in^3$).

In one or more embodiments, the SCR catalyst and/or oxidation catalyst may remain essentially on the surface of the porous filter walls. As used herein, the term "essentially on the surface" when used to describe the dispersion of the SCR catalyst and/or oxidation catalyst on the porous walls, means that at least a majority of the catalyst particles of the particular composition do not penetrate into regions within the wall thickness and become deposited on the internal surfaces throughout the thickness of the walls. Instead, the catalytic material becomes deposited on the outer surfaces of the walls, and a minority of the catalyst particles penetrates no further than about 50% into hollow regions within the wall thickness, or no further than about 33% into hollow regions within the wall thickness, or no further than about 10% into hollow regions within the wall thickness.

As used herein, the term "normalized stoichiometric ratio" or "NSR" refers to the amount of reagent (ammonia) needed to achieve the targeted $NO_x$ reduction. In other words, NSR is the mole ratio of ammonia to nitrogen oxides $NO_x$ (as $NO_2$) (e.g. $NH_3/NO_2$). NSR values can be in the range of about 0.5 to 3 moles of ammonia ($NH_3$) per mole of $NO_x$. In one or more embodiments, the engine exhaust gas systems of the invention utilize NSR values of between about 1 and 1.2, including about 1, about 1.1, and about 1.2. A NSR of about 1.0 means that the system is operating at stoichiometric levels. A NSR of 1.1 means that there is a 10% overdose of urea injected into the system, and a NSR of 1.2 means that there is a 20% overdose of urea injected into the system.

In one or more embodiments, the penetration depth may be varied to optimize filter backpressure and interaction with catalyst components applied in separate washcoating steps, wherein the penetration depth may be in the range of about 5% to about 50% of the porous wall thickness, or in the range of about 10% to about 40%, or in the range of about 5% to about 20%, or in the range of about 20% to about 35%.

The problem of balancing the several competing reactions may be addressed by the judicious selection and arrangement of catalytic materials and components in the exhaust stream, where the particulate matter (PM) can be reduced by the use of a porous wall particulate filter, oxides of nitrogen ($NO_x$) can be reduced with a selective catalytic reduction (SCR) catalyst utilizing a reductant (e.g., urea, $NH_3$), ammonia and slip can be reduced by an ammonia oxidation catalyst (AMOx).

Embodiments of the present invention relate generally to SCR catalyzed filter articles, methods of manufacturing SCR catalyzed filter articles, and methods for controlling emissions in gasoline and diesel engine exhaust streams with SCR catalyzed filter articles, where the emission treatment system of various embodiments effectively treats engine exhaust with a SCR catalyzed filter article.

The invention includes the following exemplary, non-limiting embodiments:

1. A vehicle emission system for removing $NO_x$ and particulate from the exhaust gas of a lean burn engine, the system comprising:
   a catalyst which oxidizes NO to form $NO_2$;
   a first ammonia selective catalytic reduction (SCR) catalyst disposed on a particulate filter, the first ammonia SCR catalyst having a characteristic designed to limit $NO_x$ conversion so that unconverted $NO_2$ is available to facilitate passive oxidation of soot trapped by the particulate filter by reaction with $NO_2$; and
   a second ammonia SCR catalyst downstream from the first ammonia SCR catalyst, wherein the second ammonia SCR catalyst is disposed on a flow through substrate designed to promote SCR of $NO_x$.

2. The system of embodiment 1, wherein the first ammonia SCR catalyst has a characteristic designed to provide intentionally limited and controlled SCR activity and wherein passive soot oxidation occurs on the particulate filter by reaction with $NO_2$.

3. The system of any of embodiments 1-2, wherein the NOx conversion on the particulate filter is limited to a predetermined amount.

4. The system of any of embodiments 1-3, wherein the characteristic is designed to both limit $NO_x$ conversion and facilitate passive oxidation of soot trapped by the particulate filler by retarding the SCR activity on the particulate filter to enable the passive oxidation of soot on the particulate filter.

5. The system of any of embodiments 1-4, wherein the first ammonia SCR catalyst is designed to balance the rate of reaction of particulate combustion by $NO_2$ and the rate of SCR reaction based upon NOx and particulate matter exiting the engine, and the second ammonia SCR catalyst is designed to provide additional NOx conversion to meet a targeted total system NOx conversion.

6. The system of any of embodiments 1-5, wherein the NOx conversion on the particulate filter is in the range of about 5-75% or in the range of about 10-65% or in the range of about 20-60%.

7. The system of any of embodiments 1-6, wherein the system provides a NOx conversion exceeding 90%.

8. The system of any of embodiments 1-7, wherein the system provides a NOx conversion exceeding 95%.

9. The system of any of embodiments 1-8, wherein the NOx conversion on the particulate filter is greater than the NOx conversion over the second ammonia SCR catalyst.

10. The system of any of embodiments 1-8, wherein the NOx conversion on the particulate filter is less than the NOx conversion over the second ammonia SCR catalyst.

11. The system of any of embodiments 1-10, wherein the first ammonia SCR catalyst has a characteristic designed to provide a ratio of ammonia and ammonia precursor to $NO_x$ exiting the particulate filter in the range of about 0.1 to 2.

12. The system of any of embodiments 1-11, wherein the first ammonia SCR catalyst has a characteristic designed to provide a ratio of ammonia and ammonia precursor to $NO_x$ exiting the particulate filter in the range of about 0.5 to 1.5.

13. The system of any of embodiments 1-12, further comprising a reductant injector upstream from the first ammonia SCR catalyst.

14. The system of any of embodiments 1-13, further comprising a reductant injector upstream from the second ammonia SCR catalyst.

15. The system of any of embodiments 1-14, wherein the first ammonia SCR catalyst is present at a first loading and the second ammonia SCR catalyst is present at a second loading, and the weight ratio of the second loading to the first loading is in the range of about 1:1 to 400:1.

16. The system of any of embodiments 1-15, wherein the first ammonia SCR catalyst is present at a first loading and the second ammonia SCR catalyst is present at a second loading, and the weight ratio of the second loading to the first loading is in the range of about 2:1 to 100:1.

17. The system of any of embodiments 1-16, wherein the first ammonia SCR catalyst is present at a first loading and the second ammonia SCR catalyst is present at a second loading, and the weight ratio of the second loading to the first loading is in the range of about 2:1 to 50:1.

18. The system of any of embodiments 1-17, wherein the first ammonia SCR catalyst is present at a first loading and the second ammonia SCR catalyst is present at a second loading, and the weight ratio of the second loading to the first loading is in the range of about 4:1 to about 20:1.

19. The system of any of embodiments 1-18, wherein the loading of the second ammonia SCR catalyst is in the range of about 0.1 $g/in^3$ to about 6 $g/in^3$.

20. The system of any of embodiments 1-19, wherein the loading of the second ammonia SCR catalyst is in the range of about 0.1 $g/in^3$ to about 5 $g/in^3$.

21. The system of any of embodiments 1-20, wherein the loading of the second ammonia SCR catalyst is in the range of about 0.1 $g/in^3$ to about 4 $g/in^3$.

22. The system of any of embodiments 1-21, wherein the loading of the second ammonia SCR catalyst is in the range of about 0.1 $g/in^3$ to about 3 $g/in^3$.

23. The system of any of embodiments 1-22, wherein the first and/or second ammonia SCR catalysts are each independently selected from a molecular sieve promoted with a base metal, a mixed oxide, and mixtures thereof.

24. The system of embodiment 23, wherein the mixed oxide is selected from Fe/titania, Fe/alumina, Mg/titania, Cu/titania, Ce/Zr, vanadia/titania, vanadia/titania stabilized with tungsten, and mixtures thereof.

25. The system of embodiment 23, wherein the molecular sieve is selected from an aluminosilicate zeolite, a borosilicate, a gallosilicate, a SAPO, an AlPO, a MeAPSO, and a MeAPO.

26. The system of any of embodiments 1-25, wherein the first and/or second ammonia SCR catalysts each independently comprise a small pore molecular sieve having a maximum ring size of eight tetrahedral atoms.

27. The system of any of embodiments 1-26, wherein the first and/or second ammonia SCR catalysts each independently comprise a molecular sieve selected from the group consisting of framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAY, SIV, THO, TSC, UEI, UFI, VNI, YUG and ZON.

28. The system of any of embodiments 1-27, wherein the first and/or second ammonia SCR catalysts each independently comprise a molecular sieve having a double six ring (d6r) unit.

29. The system of any of embodiments 1-28, wherein the first and/or second ammonia SCR catalysts each independently comprise a molecular sieve selected from the group consisting of framework types AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

30. The system of any of embodiments 1-29, wherein the first and/or second ammonia SCR catalysts each independently comprise a molecular sieve selected from the group consisting of framework types AEI, AFT, AFX, CHA, EAB, ERI, KFI, LEV, SAS, SAT, and SAV.

31. The system of any of embodiments 1-30, wherein the first and/or second ammonia SCR catalysts each independently comprise a molecular sieve selected from the group consisting of framework types AEI, CHA, and AFX.

32. The system of any of embodiments 1-31, wherein the first ammonia SCR catalyst comprises a molecular sieve of framework type CHA.

33. The system of any of embodiments 1-32, wherein the second ammonia SCR catalyst comprises a molecular sieve of framework type CHA.

34. The system of any of embodiments 1-33, wherein the first and/or second ammonia SCR catalysts are each independently selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

35. The system of any of embodiments 1-34, wherein the first and/or second ammonia SCR catalysts comprise SSZ-13.

36. The system of any of embodiments 26-35, wherein the first and/or second ammonia SCR catalysts each independently further includes a promoter metal selected from the group consisting of Cu, Fe, Co, Ce and Ni.

37. The system of any of embodiments 26-36, wherein the first and/or second ammonia SCR catalysts each independently further includes a promoter metal selected from Cu, Fe, and combinations thereof.

38. The system of any of embodiments 26-37, wherein the first and/or second ammonia SCR catalysts further include Cu.

39. The system of any of embodiments 26-38, wherein the first and/or second ammonia SCR catalysts each independently comprise an additive selected from mixed metal oxides, ceria, zirconia, tungsten oxide, titanium oxide and combinations thereof.

40. The system of any of embodiments 26-39, wherein the molecular sieve includes an isomorphously substituted tetravalent metal.

41. The system of embodiment 40, wherein the tetravalent metal is selected from the group consisting of Ti, Cu, Fe, Co, Ni, La, Ce, Mn, V, Ag, and combinations thereof.

42. The system of any of embodiments 1-41, further comprising an oxidation catalyst downstream from the second ammonia SCR catalyst.

43. The system of embodiment 42, wherein the oxidation catalyst is selected from an ammonia oxidation catalyst and a hydrocarbon and carbon monoxide oxidation catalyst.

44. The system of any of embodiments 42-43, wherein the oxidation catalyst is on a separate substrate downstream from the second ammonia SCR catalyst.

45. The system of any of embodiments 42-43, wherein the flow through substrate has an inlet end and an outlet end, and the oxidation catalyst is on an outlet end.

46. The system of embodiment 45, wherein the oxidation catalyst extends up to 50% of the length of the flow through substrate.

47. The system of any of embodiments 1-46, wherein the catalyst which oxidizes NO to form $NO_2$ is selected from a diesel oxidation catalyst (DOC), a lean NOx catalyst, a lean NOx trap (LNT), a catalyzed partial filter, and a low temperature lean NOx trap.

48. A vehicle emission system for removing $NO_x$ and particulates from the exhaust gas of a lean burn engine, the system comprising:
 a catalyst which oxidizes NO to form $NO_2$;
 a first ammonia selective catalytic reduction (SCR) catalyst disposed on a particulate filter, the first ammonia SCR catalyst having a characteristic designed to limit $NO_x$ conversion so that unconverted $NO_2$ is available to facilitate passive oxidation of soot trapped by the particulate filter by reaction with $NO_2$; and
 a second ammonia SCR catalyst downstream from the first SCR catalyst, wherein the second ammonia SCR catalyst is disposed on a flow through substrate designed to promote SCR of $NO_x$.

49. The system of embodiment 48, wherein the first ammonia SCR catalyst has a characteristic designed to purposely retard the SCR activity and allow ammonia slip through the particulate filter to facilitate the SCR reaction on the second ammonia SCR catalyst.

50. The system of any of embodiments 48-49, wherein the NOx conversion on the particulate filter is limited to a predetermined amount.

51. The system of any of embodiments 48-50, wherein the NOx conversion on the particulate filter is in the range of about 5-75%.

52. The system of any of embodiments 48-51, wherein the NOx conversion on the particulate filter is in the range of about 10-65%.

53. The system of any of embodiments 48-52, wherein the NOx conversion on the particulate filter is in the range of about 20-60%.

54. The system of any of embodiments 48-53, wherein the system provides a NOx conversion exceeding 90%.

55. The system of any of embodiments 48-54, wherein the system provides a NOx conversion exceeding 95%.

56. The system of any of embodiments 48-55, wherein the NOx conversion on the particulate filter is greater than the NOx conversion over the second ammonia SCR catalyst.

57. The system of any of embodiments 48-55, wherein the NOx conversion on the particulate filter is less than the NOx conversion over the second ammonia SCR catalyst.

58. The system of any of embodiments 48-57, wherein the first ammonia SCR catalyst has a characteristic designed to provide a ratio of ammonia and ammonia precursor to $NO_x$ exiting the particulate filter in the range of about 0.1 to 2.

59. The system of any of embodiments 48-58, wherein the first ammonia SCR catalyst has a characteristic designed to provide a ratio of ammonia and ammonia precursor to $NO_x$ exiting the particulate filter in the range of about 0.5 to 1.5.

60. The system of any of embodiments 48-59, further comprising a reductant injector upstream from the first ammonia SCR catalyst.

61. The system of any of embodiments 48-60, further comprising a reductant injector upstream from the second ammonia SCR catalyst.

62. The system of any of embodiments 48-61, wherein the first ammonia SCR catalyst is present at a first loading and the second ammonia SCR catalyst is present at a second loading and the weight ratio of the second loading to the first loading is in the range of about 1:1 to about 400:1.

63. The system of any of embodiments 48-62, wherein the first ammonia SCR catalyst is present at a first loading and the second ammonia SCR catalyst is present at a second loading, and the weight ratio of the second loading to the first loading is in the range of about 2:1 to about 100:1.

64. The system of any of embodiments 48-63, wherein the first ammonia SCR catalyst is present at a first loading and the second SCR catalyst is present at a second loading and the weight ratio of the second loading to the first loading is in the range of about 2:1 to about 50:1.

65. The system of any of embodiments 48-64, wherein the first ammonia SCR catalyst is present at a first loading and the second ammonia SCR catalyst is present at a second loading and the weight ratio of the second loading to the first loading is in the range of about 4:1 to about 20:1.

66. The system of any of embodiments 48-65, wherein the loading of the second ammonia SCR catalyst is in the range of about 0.1 $g/in^3$ to about 6 $g/in^3$.

67. The system of any of embodiments 48-66, wherein the loading of the second ammonia SCR catalyst is in the range of about 0.1 $g/in^3$ to about 5 $g/in^3$.

68. The system of any of embodiments 48-67, wherein the loading of the second ammonia SCR catalyst is in the range of about 0.1 $g/in^3$ to about 4 $g/in^3$.

69. The system of any of embodiments 48-68, wherein the loading of the second ammonia SCR catalyst is in the range of about 0.1 $g/in^3$ to about 3 $g/in^3$.

70. The system of any of embodiments 48-69, wherein the first and/or second ammonia SCR catalysts are each independently selected from a molecular sieve promoted with a base metal, a mixed oxide, and mixtures thereof.

71. The system of embodiment 70, wherein the mixed oxide is selected from Fe/titania, Fe/alumina, Mg/titania, Cu/titania, Ce/Zr, vanadia/titania, vanadia/titania stabilized with tungsten, and mixtures thereof.

72. The system of embodiment 70, wherein the molecular sieve is selected from an aluminosilicate zeolite, a borosilicate, a gallosilicate, a SAPO, an AlPO, a MeAPSO, and a MeAPO.

73. The system of any of embodiments 48-72, wherein the first and/or second ammonia SCR catalysts each individually comprise a small pore molecular sieve having a maximum ring size of eight tetrahedral atoms.

74. The system of any of embodiments 48-73, wherein the first and/or second ammonia SCR catalysts each independently comprise a molecular sieve selected from the group consisting of framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAY, SIV, THO, TSC, UEI, UFI, VNI, YUG and ZON.

75. The system of any of embodiments 48-74, wherein the first and/or second ammonia SCR catalysts each independently comprise a molecular sieve having a double six ring (d6r) unit.

76. The system of any of embodiments 48-75, wherein the first and/or second ammonia SCR catalysts each independently comprise a molecular sieve selected from the group consisting of framework types AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

77. The system of any of embodiments 48-76, wherein the first and/or second ammonia SCR catalysts each independently comprise a molecular sieve selected from the group consisting of framework types AEI, AFT, AFX, CHA, EAB, ERI, KFI, LEV, SAS, SAT, and SAV.

78. The system of any of embodiments 48-77, wherein the first and/or second ammonia SCR catalysts each independently comprise a molecular sieve selected from the group consisting of framework types AEI, CHA, and AFX.

79. The system of any of embodiments 48-78, wherein the first ammonia SCR catalyst comprises a molecular sieve of framework type CHA.

80. The system of any of embodiments 48-79, wherein the second ammonia SCR catalyst comprises a molecular sieve of framework type CHA.

81. The system of any of embodiments 48-80, wherein the first and/or second ammonia SCR catalysts are each independently selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

82. The system of any of embodiments 48-81, wherein the first and/or second ammonia SCR catalysts comprise SSZ-13.

83. The system of any of embodiments 73-82, wherein the first and/or second ammonia SCR catalysts each independently further includes a promoter metals selected from the group consisting of Cu, Fe, Co, Ce and Ni.

84. The system of any of embodiments 73-83, wherein the first and/or second ammonia SCR catalysts further include a promoter metals selected from Cu, Fe, and combinations thereof.

85. The system of any of embodiments 73-84, wherein the first and/or second ammonia SCR catalysts further include Cu.

86. The system of any of embodiments 73-85, wherein the first and/or second SCR catalysts each independently comprise an additive selected from mixed metal oxides, ceria, zirconia, tungsten oxide, titanium oxide and combinations thereof.

87. The system of any of embodiments 73-86, wherein the molecular sieve includes an isomorphously substituted tetravalent metal.

88. The system of embodiment 87, wherein the tetravalent metal is selected from the group consisting of Ti, Cu, Fe, Co, Ni, La, Ce, Mn, V, Ag, and combinations thereof.

89. The system of any of embodiments 48-88, further comprising an oxidation catalyst downstream from the second ammonia SCR catalyst.

90. The system of embodiment 89, wherein the oxidation catalyst is selected from an ammonia oxidation catalyst and a hydrocarbon and carbon monoxide oxidation catalyst.

91. The system of any of embodiments 89-90, wherein the oxidation catalyst is on a separate substrate downstream from the second ammonia SCR catalyst.

92. The system of any of embodiments 89-90, wherein the flow through substrate has an inlet end and an outlet end, and the oxidation catalyst is on the outlet end.

93. The system of embodiment 92, wherein the oxidation catalyst extends up to 50% of the length of the flow through substrate.

94. The system of any of embodiments 1-46, wherein the catalyst which oxidizes NO to form $NO_2$ is selected from a diesel oxidation catalyst (DOC), a lean NOx catalyst, a lean NOx trap (LNT), a catalyzed partial filter, and a low temperature lean NOx trap.

95. A method of treating lean burn engine exhaust gas containing $NO_x$ and particulate matter, the method comprising:
  contacting the exhaust gas with a catalyst which oxidizes NO to form $NO_2$ to provide an exhaust gas stream containing an enhanced amount of $NO_2$;
  contacting the exhaust gas having an enhanced amount of $NO_2$ with a first ammonia selective catalytic reduction (SCR) catalyst disposed on a particulate filter, wherein the first ammonia SCR catalyst is designed to limit $NO_x$ conversion so that unconverted $NO_2$ is available to facilitate passive oxidation of soot trapped by the particulate filter by reaction with $NO_2$; and
  contacting the exhaust gas exiting the particulate filter with a second ammonia SCR catalyst on a flow through substrate downstream from the particulate filter.

96. The method of embodiment 95, wherein the first ammonia SCR catalyst is designed to balance the rate of reaction of particulate combustion by $NO_2$ and the rate of SCR reaction based upon NOx and particulate matter exiting the engine, and the second SCR catalyst is designed to provide additional NOx conversion to meet a targeted total system NOx conversion.

97. The method of any of embodiments 95-96, wherein the NOx conversion on the particulate filter is limited to a predetermined amount.

98. The method of any of embodiments 95-97, wherein the NOx conversion on the particulate filter is in the range of about 5-75%.

99. The method of any of embodiments 95-98, wherein the NOx conversion on the particulate filter is in the range of about 10-65%.

100. The method of any of embodiments 95-99, wherein the NOx conversion on the particulate filter is in the range of about 20-60%.

101. The method of any of embodiments 95-100, wherein the method provides a NOx conversion exceeding 90%.

102. The method of any of embodiments 95-101, wherein the method provides a NOx conversion exceeding 95%.

103. The method of any of embodiments 95-102, wherein the NOx conversion on the particulate filter is greater than the NOx conversion over the second ammonia SCR catalyst.

104. The method of any of embodiments 95-102, wherein the NOx conversion on the particulate filter is less than the NOx conversion over the second ammonia SCR catalyst.

105. The method of any of embodiments 95-104, wherein the first ammonia SCR catalyst has a characteristic designed to provide a ratio of ammonia and ammonia precursor to $NO_x$ exiting the particulate filter in the range of about 0.1 to about 2.

106. The method of any of embodiments 95-105, wherein the first ammonia SCR catalyst has a characteristic designed to provide a ratio of ammonia and ammonia precursor to $NO_x$ exiting the particulate filter in the range of about 0.5 to about 1.5.

107. The method of any of embodiments 95-106, further comprising injecting a reductant upstream from the first ammonia SCR catalyst.

108. The method of any of embodiments 95-107, further comprising injecting a reductant upstream from the second ammonia SCR catalyst.

109. The method of any of embodiments 95-108, wherein the first ammonia SCR catalyst is present at a first loading and the second ammonia SCR catalyst is present at a second loading, and the weight ratio of the second loading to the first loading is in the range of about 1:1 to about 400:1.

110. The method of any of embodiments 95-109, wherein the first ammonia SCR catalyst is present at a first loading and the second ammonia SCR catalyst is present at a second loading, and the weight ratio of the second loading to the first loading is in the range of about 2:1 to about 100:1.

111. The method of any of embodiments 95-110, wherein the first ammonia SCR catalyst is present at a first loading and the second ammonia SCR catalyst is present at a second loading, and the weight ratio of the second loading to the first loading is in the range of about 2:1 to about 50:1.

112. The method of any of embodiments 95-111, wherein the first ammonia SCR catalyst is present at a first loading and the second ammonia SCR catalyst is present at a second loading, and the weight ratio of the second loading to the first loading is in the range of about 4:1 to about 20:1.

113. The method of any of embodiments 95-112, wherein the loading of the second ammonia SCR catalyst is in the range of about 0.1 $g/in^3$ to about 6 $g/in^3$.

114. The method of any of embodiments 95-113, wherein the loading of the second ammonia SCR catalyst is in the range of about 0.1 $g/in^3$ to about 5 $g/in^3$.

115. The method of any of embodiments 95-113, wherein the loading of the second ammonia SCR catalyst is in the range of about 0.1 $g/in^3$ to about 4 $g/in^3$.

116. The method of any of embodiments 95-113, wherein the loading of the second ammonia SCR catalyst is in the range of about 0.1 $g/in^3$ to about 3 $g/in^3$.

117. The method of any of embodiments 95-116, wherein the first and/or second ammonia SCR catalysts are each independently selected from a molecular sieve promoted with a base metal, a mixed oxide, and mixtures thereof.

118. The method of embodiment 117, wherein the mixed oxide is selected from Fe/titania, Fe/alumina, Mg/titania, Cu/titania, Ce/Zr, vanadia/titania, vanadia/titania stabilized with tungsten, and mixtures thereof.

119. The method of embodiment 117, wherein the molecular sieve is selected from an aluminosilicate zeolite, a borosilicate, a gallosilicate, a SAPO, an AlPO, a MeAPSO, and a MeAPO.

120. The method of any of embodiments 95-119, wherein the first and/or second ammonia SCR catalysts each independently comprise a small pore molecular sieve having a maximum ring size of eight tetrahedral atoms.

121. The method of any of embodiments 95-120, wherein the first and/or second ammonia SCR catalysts each independently comprise a molecular sieve selected from the group consisting of framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAY, SIV, THO, TSC, UEI, UFI, VNI, YUG and ZON.

122. The method of any of embodiments 95-121, wherein the first and/or second ammonia SCR catalysts comprise a molecular sieve having a double six ring (d6r) unit.

123. The method of any of embodiments 95-122, wherein the first and/or second ammonia SCR catalysts each independently comprise a molecular sieve selected from the group consisting of framework types AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

124. The method of any of embodiments 95-123, wherein the first and/or second ammonia SCR catalysts each independently comprise a molecular sieve selected from the group consisting of framework types AEI, AFT, AFX, CHA, EAB, ERI, KFI, LEV, SAS, SAT, and SAV.

125. The method of any of embodiments 95-124, wherein the first and/or second ammonia SCR catalysts each independently comprise a molecular sieve selected from the group consisting of framework types AEI, CHA, and AFX.

126. The method of any of embodiments 95-125, wherein the first ammonia SCR catalyst comprises a molecular sieve of framework type CHA.

127. The method of any of embodiments 95-126, wherein the second ammonia SCR catalyst comprises a molecular sieve of framework type CHA.

128. The method of any of embodiments 95-126, wherein the first and/or second ammonia SCR catalysts are each independently selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

129. The method of any of embodiments 95-128, wherein the first and/or second ammonia SCR catalysts comprise SSZ-13.

130. The method of any of embodiments 120-129, wherein the first and/or second ammonia SCR catalysts further include a promoter metals selected from the group consisting of Cu, Fe, Co, Ce and Ni.

131. The method of any of embodiments 120-130, wherein the first and/or second ammonia SCR catalysts further include a promoter metal selected from Cu, Fe, and combinations thereof.

132. The method of any of embodiments 120-131, wherein the first and/or second ammonia SCR catalysts further include Cu.

133. The method of any of embodiments 120-132, wherein the first and/or second ammonia SCR catalyst each independently comprise an additive selected from mixed metal oxides, ceria, zirconia, tungsten oxide, titanium oxide and combinations thereof.

134. The method of any of embodiments 120-133, wherein the molecular sieve includes an isomorphously substituted tetravalent metal.

135. The method of embodiment 134, wherein the tetravalent metal is selected from the group consisting of Ti, Cu, Fe, Co, Ni, La, Ce, Mn, V, Ag, and combinations thereof.

136. The method of any of embodiments 95-135, further comprising contacting the exhaust gas with an oxidation catalyst downstream from the second ammonia SCR catalyst.

137. The method of embodiment 136, wherein the oxidation catalyst is selected from an ammonia oxidation catalyst and a hydrocarbon and carbon monoxide oxidation catalyst.

138. The method of any of embodiments 136-137, wherein the oxidation catalyst is on a separate substrate downstream from the second ammonia SCR catalyst.

139. The method of any of embodiments 136-137, wherein the flow through substrate has an inlet end and an outlet end, and the oxidation catalyst is on an outlet end.

140. The method of embodiment 139, wherein the oxidation catalyst extends up to 50% of the length of the flow through substrate.

141. The method of any of embodiments 95-140, wherein the catalyst which oxidizes NO to form $NO_2$ is selected from diesel oxidation catalyst (DOC), a lean NOx catalyst, a lean NOx trap (LNT), a catalyzed partial filter, and a low temperature lean NOx trap.

142. The system of any of embodiments 1-94, wherein the SCR catalyst characteristic is selected from one or more of SCR catalyst type, combinations of SCR catalyst types, SCR catalyst loading, SCR catalyst concentration, axial location of the SCR catalyst on the particulate filter, local loading of the SCR catalyst on the particulate filter, length of the SCR catalyst coating on the filter, SCR catalyst promoter metal selection, SCR catalyst promoter metal content, SCR catalyst washcoat porosity, SCR catalyst washcoat pore distribution, SCR catalyst particle size and SCR catalyst crystal size.

143. The system of any of embodiments 1-94, and 142 wherein the SCR catalyst disposed on the particulate filter is present at a loading in the range of about 0.01 $g/in^3$ to about 2.5 $g/in^3$.

144. The system of any of embodiments 1-94, and 142 wherein the SCR catalyst disposed on the particulate filter is present at a loading in the range of about 0.02 $g/in^3$ to about 2.5 $g/in^3$.

145. The system of any of embodiments 1-94, and 142 wherein the SCR catalyst disposed on the particulate filter is present at a loading in the range of about 0.03 $g/in^3$ to about 2.5 $g/in^3$.

146. The method of any of embodiments 95-141, wherein the SCR catalyst characteristic is selected from one or more of SCR catalyst type, combinations of SCR catalyst types, SCR catalyst loading, SCR catalyst concentration, axial location of the SCR catalyst on the particulate filter, local loading of the SCR catalyst on the particulate filter, length of the SCR catalyst coating on the filter, SCR catalyst promoter metal selection, SCR catalyst promoter metal content, SCR catalyst washcoat porosity, SCR catalyst washcoat pore distribution, SCR catalyst particle size and SCR catalyst crystal size.

147. The method of any of embodiments 95-141, and 146, wherein the SCR catalyst disposed on the particulate filter is present at a loading in the range of about 0.01 $g/in^3$ to about 2.5 $g/in^3$.

148. The system of any of embodiments 95-141, and 146, wherein the SCR catalyst disposed on the particulate filter is present at a loading in the range of about 0.02 $g/in^3$ to about 2.5 $g/in^3$.

149. The system of any of embodiments 95-141, and 146, wherein the SCR catalyst disposed on the particulate filter is present at a loading in the range of about 0.03 $g/in^3$ to about 2.5 $g/in^3$.

150. The system of any of embodiments 1-149, wherein the particulate filter is a wall flow filter as further described herein.

Particulate filters used to remove particulate matter or soot from lean burn engine exhaust have high filtration capabilities. Integration of NOx reduction and particulate removal functions into a single catalyst article is accomplished using a particulate filter coated with an SCR catalyst composition.

However, as noted above, oxidation of soot trapped on the filter and the SCR reaction compete for $NO_2$ when an SCR catalyst composition is disposed on a particulate filter. If the SCR process consumes too much $NO_2$, soot oxidation on the filter may be limited or may not occur at all.

According to one or more embodiments, conversion on the particulate filter is limited to a predetermined amount. "Predetermined" means a value or a range chosen in advance, where that value or range can be determined by an amount or percentage of $NO_2$ required to produce an intended result for both of the competing reactions. Thus, for example, depending on the NOx content of the exhaust gas exiting the engine (as determined by engine size, operating conditions (e.g., lean/rich), etc.), the amount of conversion of NOx may be determined and chosen in advance to control the SCR process on the particulate filter and provide sufficient $NO_2$ to obtain sufficient passive regeneration of the SCRoF.

According to one or more embodiments, a first ammonia selective catalytic reduction (SCR) catalyst disposed on a particulate filter has a characteristic designed to limit $NO_x$ conversion so that unconverted $NO_2$ is available to facilitate passive oxidation of soot trapped by the particulate filter by reaction with $NO_2$. As such, this SCR can be described as limiting $NO_x$ conversion and facilitating passive oxidation of soot trapped by the particulate filter (by reaction with $NO_2$). In one or more embodiments, the characteristic of the first ammonia SCR catalyst is designed to provide intentionally limited and controlled SCR activity and passive soot oxidation occurs on the particulate filter by reaction with $NO_2$. According to one or more embodiments, the first SCR catalyst has a characteristic designed to purposely retard the SCR activity and allow ammonia slip through the particulate filter to facilitate the SCR reaction on the second ammonia SCR catalyst.

According to one or more embodiments, the "characteristic" of the first ammonia SCR catalyst is selected from one or more of SCR catalyst type, combinations of SCR catalyst types, SCR catalyst loading, SCR catalyst concentration, axial location of the SCR catalyst on the particulate filter, local loading of the SCR catalyst on the particulate filter, length of the SCR catalyst coating on the filter, SCR catalyst promoter metal selection, SCR catalyst promoter metal content, SCR catalyst washcoat porosity, SCR catalyst washcoat pore distribution, SCR catalyst particle size and SCR catalyst crystal size.

SCR catalyst type refers to the SCR catalyst materials, for example, mixed oxides and molecular sieve materials which can be promoted with a promoter metal. Examples of mixed oxides include, but are not limited to, mixed oxides selected from Fe/titania, Fe/alumina, Mg/titania, Cu/titania, Ce/Zr, vanadia/titania, vanadia/titania stabilized with tungsten, and mixtures thereof. Changing the vanadia content of a vanadia/titania catalyst can change the NOx conversion of the catalyst material. Molecular sieve materials are widely used as SCR catalyst materials. The selection of a specific framework type of a molecular sieve can determine the amount of SCR NOx conversion of the SCR catalyst material. Furthermore, the type of molecular sieve, for example, whether the molecular sieve is an aluminosilicate zeolite, a borosilicate, a gallosilicate, a SAPO, an AlPO, a MeAPSO, and/or a MeAPO will determine the the amount of SCR NOx conversion of the SCR catalyst material. Thus, by selecting a particular SCR catalyst type, a target or desired level of SCR NOx conversion can be achieved or modified for the particulate filter.

Another SCR catalyst "characteristic" that affects $NO_x$ conversion is combinations of SCR catalyst types. Catalyst materials can be combined to change the SCR NOx conversion of the catalyst. This can be achieved by mixing different catalyst types by providing different SCR catalyst types in the same washcoat in different weight ratios, for example. Other ways SCR catalyst combinations can be modified to change the SCR NOx conversion is by layering different SCR catalyst types in various combinations. For example, different SCR catalyst types can be layered in a relationship with one type of material layered over a layer of a different type of material. Alternatively, different SCR catalyst types can be arranged in an upstream and downstream configuration to achieve a desired SCR NOx conversion. Thus, different combinations of SCR catalyst types can be provided to achieve or modify the desired or target SCR NOx conversion.

Another SCR catalyst "characteristic" that affects $NO_x$ conversion is SCR catalyst loading. Generally, increasing the loading of the SCR catalyst on the particulate filter can increase the SCR NOx conversion, and decreasing the loading will decrease the NOx conversion. The level of loading on the particulate filter can be determined experimentally to achieve or modify the desired or target SCR NOx conversion.

Another SCR catalyst "characteristic" that affects $NO_x$ conversion is SCR catalyst concentration. Concentration refers to the amount or loading of SCR catalyst in a particular location. For example, along the axial length of a particulate filter, the loading may be varied to achieve modify the target or desired SCR NOx conversion.

Another SCR catalyst "characteristic" that affects $NO_x$ conversion is axial location of the SCR catalyst on the particulate filter. The SCR catalyst can be located in different axial locations of the filter, and the axial location can be selected to achieve or modify the desired or target SCR NOx conversion.

Another SCR catalyst "characteristic" that affects $NO_x$ conversion is local loading of the SCR catalyst on the particulate filter. Local loading is defined above. As one non-limiting example, the SCR catalyst can be distributed in the filter such that there is no catalyst on the inlet end of the filter, and a selected loading at the outlet end of the filter. The "local loading" in such embodiments refers to the loading at the outlet end where catalyst is present. The local loading can be selected to achieve or modify the desired or target SCR NOx conversion on the particulate filter.

Another SCR catalyst "characteristic" that affects $NO_x$ conversion is length of the SCR catalyst coating on the filter. Changing the length of the SCR catalyst coating on the filter can change the amount of NOx conversion that occurs on the particulate filter. The SCR catalyst may extend, e.g., 10%, 20%, 30%, 40%, 50%, 60%, 70%, 80%, 90% or 100% of the length of the particulate filter. The coating length can be selected to achieve or modify the desired or target SCR NOx conversion on the particulate filter.

Another SCR catalyst "characteristic" that affects $NO_x$ conversion is SCR catalyst promoter metal selection. For molecular sieves, various promoter metals can be selected. The promoter metals can be on the molecular sieve or exchanged with the molecular sieve. Promoter metal examples include Cu, Fe, Ni, Co, and Ce. The promoter can be selected to achieve or modify the desired or target SCR NOx conversion.

Another SCR catalyst "characteristic" that affects $NO_x$ conversion is SCR catalyst promoter metal content. Exemplary ranges of promoter metal contents include amounts of about 0.05 to 20% by weight of the SCR catalyst, about 0.05 to 10% by weight of the SCR catalyst, and about 0.1 to 5% by weight of the SCR catalyst. The specific amount of promoter metal can be selected to achieve or modify the desired or target SCR NOx conversion.

Other SCR catalyst "characteristics" that affect $NO_x$ conversion are SCR catalyst washcoat porosity and washcoat pore distribution. Depending on the properties of the washcoat, for example the solids loading viscosity, agglomeration of particles and other factors, the level of porosity and pore distribution of the washcoat of the SCR catalyst composition can be modified. The porosity and pore distribution can be selected to achieve or modify the desired or target SCR NOx conversion.

Another SCR catalyst "characteristic" that affects $NO_x$ conversion is SCR catalyst particle size. Different particle sizes of the SCR catalyst materials can be selected to achieve or modify the desired or target SCR NOx conversion.

Another SCR catalyst "characteristic" that affects $NO_x$ conversion is SCR catalyst crystal size. Different crystal sizes of the SCR catalyst material can be selected to achieve or modify the desired or target SCR NOx conversion.

One or more of the above mentioned above SCR catalyst "characteristics" can be modified, either alone or combination, to achieve or modify the desired or target SCR NOx conversion. A person of ordinary skill in the art can modify or select one or a combination of the SCR catalyst characteristics to achieve or modify the desired or target SCR NOx conversion.

According to one or more embodiments, a method of treating lean burn engine exhaust is provided wherein a first SCR catalyst is designed to balance the rate of reaction of particulate combustion by $NO_2$ and the rate of SCR reaction based upon NOx and particulate matter exiting the engine, and a second SCR catalyst is designed to provide additional NOx conversion to meet a targeted total system NOx conversion. As discussed above, one or more SCR catalyst characteristics can be selected to achieve or modify the desired or target SCR NOx conversion.

In one or more embodiments, the SCR catalyst is disposed throughout the wall of the particulate filter along the entire length and permeates the whole cross-section of the wall. This allows for the SCR catalyst to permeate all filter pores and to spread over the maximum filter volume, thereby minimizing backpressure, and ensuring no by-passing of the SCR catalyst.

One or more embodiments of the invention are directed to catalyzed particulate filters comprising a plurality of longitudinally extending passages formed by longitudinally extending porous walls bounding and defining the passages and an axial length extending between an inlet end and an outlet end. The passages comprise inlet passages open at the inlet end and closed at the outlet end, and outlet passages being closed at the inlet end and open at the outlet end.

As used herein, the terms "inlet end" and "outlet end" are in reference to the intended and accepted path of an exhaust gas through a catalytic article, where an untreated exhaust gas passes into a catalytic article at an inlet end, and a treated exhaust gas exits from an outlet end of the catalytic article. In various embodiments, the outlet end of the catalytic article is opposite the inlet end.

In various embodiments, an SCR catalyst composition may be disposed within the porous walls and/or on the walls of the inlet passages extending from the inlet end and less than the full axial length of the wall flow filter.

Particulate Filter

Principles and embodiments of the present invention relate to a catalyzed particulate filter comprising a substrate having porous walls and a first selective catalytic reduction (SCR) catalyst associated therewith.

In one or more embodiments, the particulate filter comprises a plurality of porous walls having a length extending longitudinally to form a plurality of parallel passages extending from an inlet end to an outlet end, wherein a quantity of the passages are inlet passages that are open at the inlet end and closed at the outlet end, and a quantity of passages different from the inlet passages are outlet passages that are closed at the inlet end and open at the outlet end. In various embodiments, the passages are closed with a plug, wherein the plug may have a length of about ¼" long.

In one or more embodiments, the particulate filter has an inlet end into which gases may enter the inlet passages, and an outlet end from which gases may exit the outlet passages, where the gases pass from an inlet passage to an outlet passage by moving through the porous walls forming the parallel passages of the particulate filter.

In one or more embodiments, the porous walls have a porosity in the range of about 40% to about 75%, or in the range of about 40% to about 60%, or in the range of about 50% to about 70%, or in the range of about 50% to about 65%, or in the range of about 60% to about 70%, or in the range of about 55% to about 65%. In various embodiments the porous walls have a porosity in the range of about 60% to about 65%.

In one or more embodiments, the mean pore size of the porous walls is in the range of about 10 µm to about 30 µm, or about 10 µm to about 25 µm, or about 20 µm to about 25 µm. In various embodiments, the mean pore size of the porous walls is in the range of about 15 µm to about 25 µm.

Selective Catalytic Reduction Catalyst

As indicated above, in various embodiments, more than one SCR catalyst is employed in the systems and methods disclosed herein, and the following details are intended to refer to the first, second, or both the first and second SCR catalysts. It is understood that the characteristics of the first and second SCR catalysts may be different and providing SCR catalysts with different compositions is one way of obtaining such a difference.

In one or more embodiments, the selective catalytic reduction catalyst comprises a molecular sieve and a metal. Alternatively, the SCR catalyst can be a mixed oxide as described herein.

In one or more embodiments, the selective catalytic reduction catalyst comprises a molecular sieve. In various embodiments, the molecular sieve may have a zeolitic framework, and the zeolitic framework may have ring sizes no larger than 12.

In one or more embodiments, the zeolitic framework material comprises a double-six ring (d6r) unit.

In one or more embodiments, the zeolitic framework material may be selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In various embodiments, the zeolitic framework material may be selected from AEI, CHA, AFX, ERI, KFI, LEV, and combinations thereof. In various embodiments, the zeolitic framework material may be selected from AEI, CHA, and AFX. In various embodiments, the zeolitic framework material is CHA.

In one or more embodiments, the selective catalytic reduction catalyst further comprises a metal, which may be a base metal.

In various embodiments, the selective catalytic reduction catalyst is promoted with a metal selected from Cu, Fe, Co, Ni, La, Ce, Mn, V, Ag, and combinations thereof. In various embodiments, the selective catalytic reduction catalyst is promoted with a metal selected from Cu, Fe, Ag, and combinations thereof. In various embodiments, the selective catalytic reduction catalyst is promoted with Cu and/or Fe.

In one or more embodiments, the zeolitic framework material is CHA promoted with copper or iron.

The SCR catalyst loadings can vary, as referenced herein. In certain embodiments, the loading of the first SCR catalyst can be at least about 0.01 $g/in^3$ (e.g., including, but not limited to, the ranges of about 0.01 $g/in^3$ to about 1.25 $g/in^3$, about 0.02 $g/in^3$ to about 0.95 $g/in^3$, about 0.03 $g/in^3$ to about 0.05 $g/in^3$, about 0.01 $g/in^3$ to about 2.5 $g/in^3$, about 0.02 $g/in^3$ to about 2.5 $g/in^3$, or about 0.03 $g/in^3$ to about 2.5 $g/in^3$). In certain embodiments, the loading of the second SCR catalyst can be at least about 0.1 $g/in^3$ (e.g., including, but not limited to, the ranges of 0.1 $g/in^3$ to about 6 $g/in^3$, about 0.1 $g/in^3$ to about 5 $g/in^3$, about 0.1 $g/in^3$ to about 4 $g/in^3$, about 0.1 $g/in^3$ to about 3 $g/in^3$, about 1 $g/in^3$ to about 6 $g/in^3$, about 1 $g/in^3$ to about 5 $g/in^3$, about 1 $g/in^3$ to about 4 $g/in^3$, or about 1 $g/in^3$ to about 3 $g/in^3$).

Catalyst which Oxidizes NO to $NO_2$

Upstream from the particulate filter, a catalyst which oxidizes NO to form $NO_2$ is provided. Such a catalyst can, in some embodiments, comprise an oxidation catalyst comprising a PGM. As used herein, "platinum group metal" (PGM) refers to platinum, palladium, rhodium, ruthenium, osmium, and iridium, or combinations thereof, and their oxides. In one or more embodiments, the oxidation catalyst comprises platinum, palladium, or a combination thereof. In one or more embodiments, the oxidation catalyst comprises at least one platinum group metal on a plurality of particles, and the plurality of particles of the oxidation catalyst may have a composition of alumina, titania, zirconia, silica, silica/alumina, or a combination thereof.

In one or more embodiments, the platinum group metal may be impregnated into the alumina, titania, zirconia, silica, and/or silica/alumina particles by the incipient wetness technique followed by a thermal treatment between 400° C. and 600° C. In one or more embodiments, the oxidation catalyst is a PGM-containing material, provided in the form of a slurry having a D90<3 microns, a D90<5 microns, a D90<10 microns, or a D90≈5-7 microns.

The catalyst which oxidizes NO can be selected from diesel oxidation catalyst (DOC), a lean NOx catalyst, a lean NOx trap (LNT), a catalyzed partial filter, and a low temperature lean NOx trap.

Exhaust System and Methods

Principles and embodiments of the present invention also relate to catalytic exhaust systems incorporating at least one catalyzed particulate filter, as described herein. In various embodiments, the catalytic exhaust system may comprise a catalyzed particulate filter and one or more additional components for reducing a plurality of gaseous pollutants and/or some proportion of the particulate matter.

In one or more embodiments, a urea injector, also referred to as a reductant dosing system, may be provided upstream of the catalyzed particulate filter to inject a NOx reductant into the exhaust stream to facilitate operation of an SCR catalyst incorporated into the catalyzed particulate filter. As disclosed in U.S. Pat. No. 4,963,332, which is hereby incorporated by reference in its entirety for all purposes, NOx upstream and downstream of the catalytic converter can be sensed, and a pulsed dosing valve can be controlled by the upstream and/or downstream signals.

In alternative configurations, such as in the systems disclosed in U.S. Pat. No. 5,522,218, which is hereby incorporated by reference in its entirety for all purposes, the pulse width of the reductant injector may be controlled from sensor values and/or maps of exhaust gas temperature and engine operating conditions such as engine rpm, transmission gear and engine speed. Reductant pulse metering systems are described in U.S. Pat. No. 6,415,602, the discussion of which is hereby incorporated by reference in its entirety for all purposes.

In various embodiments, the exhaust system may comprise an exhaust manifold, an exhaust pipe (or a down pipe, or a Y-pipe), a muffler, and a tailpipe. A catalytic exhaust system may be inserted into the exhaust system at the Y-pipe and/or exhaust pipe to treat the exhaust gas from an internal combustion engine prior to the gases exiting the tailpipe to the atmosphere.

In one or more embodiments, the catalytic exhaust system comprises a monolithic catalytic substrate having a length, a width, a height, and a precious metal loading. In various embodiments, the monolithic catalytic substrate has a shape that may be: cylindrical, having a diameter that defines a cross-sectional area and a length; elliptical, having a major axis and a minor axis that defines a cross-sectional area and a length; or oblong, having a chief axis and a transverse diameter that defines a cross-sectional area and a length, and wherein the monolithic catalytic substrate has a precious metal loading to provide an intended level of catalytic activity.

In one or more embodiments, the precious metal loading may comprise one or more platinum group metals, one or more base metals, one or more precious and/or base metal oxides, or a combination thereof.

In various embodiments, the catalytic exhaust system may comprise two-way catalysts, three-way conversion (TWC) catalysts (used primarily on stoichiometric-burning gasoline engines), diesel oxidation catalysts (DOCs) (used primarily on lean-burning diesel engines), selective catalytic reduction (SCR) catalysts, lean nitrous oxide catalysts (LNCs), ammonia slip catalysts (ASCs), ammonia oxidation catalysts (AMOx), NOx absorbers, also called NOx storage/release catalysts (NSR), and lean $NO_x$ traps (LNTs), diesel particulate filters (DPFs), gasoline particulate filters (GPFs), partial oxidation catalysts (POCs), and catalyzed soot filters (CSFs), as well as combinations thereof.

Figure 2:
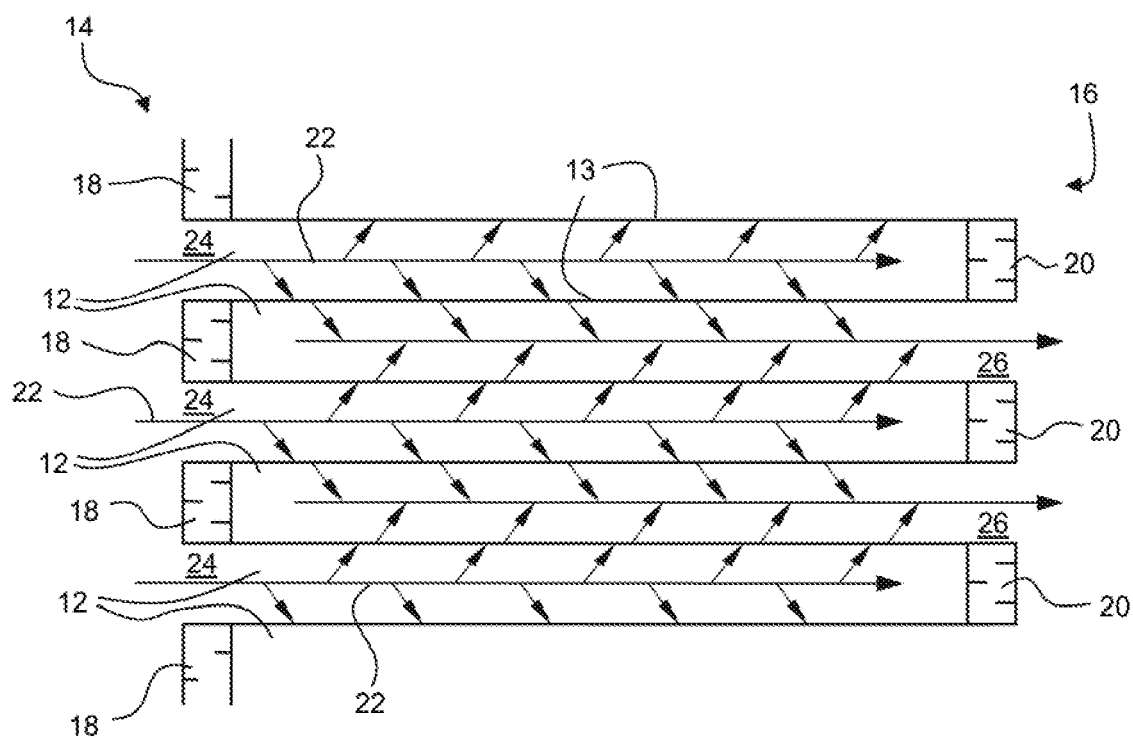
FIG. 2 illustrates a cross-sectional view of an exemplary embodiment of a plurality of porous walls extending longitudinally from an inlet end to an outlet end of a wall flow filter substrate.

In various embodiments, the catalytic exhaust system may include but not be limited to a Diesel Oxidation Catalyst (DOC), Lean NOx trap (LNT), Passive NOx Absorber (PNA), a lean NOx catalyst, a low temperature lean NOx trap, and a catalyzed partial filter. A separate oxidation catalyst can be provided downstream from the first and second SCR catalysts to provide for oxidation of one or more of ammonia, hydrocarbons, and carbon monoxide FIGS. 1 and 2 illustrate a typical wall flow filter substrate 10 (also referred to as a wall flow filter) which has a plurality of passages 12. The passages are formed and tubularly enclosed by the internal walls 13 of the filter substrate. FIG. 1 depicts an external view of an embodiment of a wall flow filter substrate having an inlet end 14 and an outlet end 16. Alternate passages are plugged at the inlet end with inlet plugs 18 (shown in black), and at the outlet end with outlet plugs 20 to form opposing checkerboard patterns at the inlet 14 and outlet 16 ends of the substrate.

FIG. 2 illustrates a cross-sectional view of an embodiment of a plurality of porous walls extending longitudinally from an inlet end to an outlet end of a wall flow filter substrate. A partial cross-sectional view of an embodiment of a plurality of porous walls 13 extending longitudinally from an inlet end 14 to an outlet end 16, and forming a plurality of parallel passages 12 is shown. A gas stream 22 (shown as arrows) enters through the open, unplugged end of inlet passages 24, is stopped at the closed end by outlet plug 20, and diffuses through the porous walls 13 forming the passages to the outlet passages 26. The gas stream 22 exits the filter by flowing through the open, unplugged end of outlet passages 26, and is stopped at the closed end by inlet plug 18. The gas is prevented from flowing backwards to the inlet end of the filter from the outlet passages by the inlet plugs 18, and prevented from re-entering the inlet passages from the outlet end by the outlet plugs 20. In this manner, a quantity of the passages are inlet passages that are open at the inlet end and closed at the outlet end, and a quantity of passages are outlet passages that are closed at the inlet end and open at the outlet end, where the outlet passages are different passages than the inlet passages.

Figure 3:
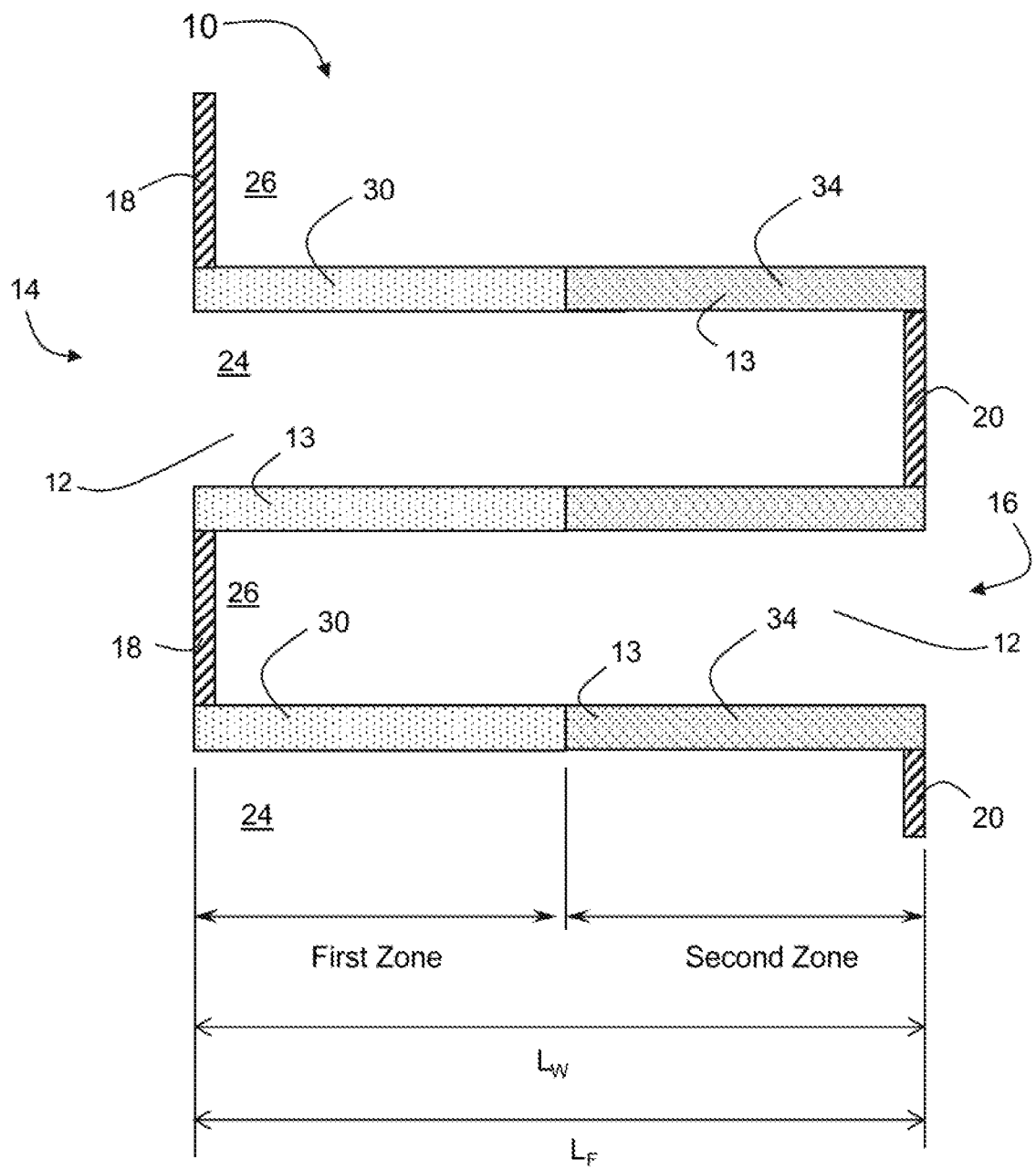
FIG. 3 illustrates a magnified view of a cross-section of an exemplary embodiment of a plurality of porous walls of a wall flow filter substrate.

FIG. 3 illustrates a magnified view of a cross-section of an exemplary embodiment of a plurality of porous walls of a wall flow filter substrate having a plurality of zones. The catalyst article shown comprises a wall flow filter 10 having a plurality of longitudinally extending passages 12 formed by longitudinally extending porous walls 13 bounding and defining the passages 24 and 26, where the walls have an axial length '$L_W$' extending between an inlet end 14 and an outlet end 16 of the wall flow filter having a length '$L_F$'. In various embodiments, filter length '$L_F$'≥axial wall length '$L_W$'. In various embodiments, the porous walls have substantially uniform porosity throughout. The passages 24 and 26 comprise inlet passages 24 which are open at the inlet end 14 and closed at the outlet end 16, and outlet passages 26 which are closed at the inlet end 14 and open at the outlet end 16.

In one or more embodiments, at least two catalytic zones, 30 and 34, are formed by at least one coating along the length '$L_W$' of the porous walls 13, wherein the coating(s) may permeate the thickness of the porous walls 13. In various embodiments, the coating(s) are disposed along the length '$L_W$' of the porous walls 13 in different spatial arrangements.

In various embodiments, the different zones may be distinguished from each other by a change in the composition of the catalytic coating, a change in the loading of the catalytic coating, a change in the combination of one or more catalytic coatings, or any combination thereof, along the length of a porous wall. In some embodiments one zone may have no catalytic coating, or in other words zero loading of catalyst. For example, zone 30 may contain no coating, while zone 34 contains a coating with a local loading. Alternatively, zone 34 may contain no catalytic coating, while zone 30 contains a coating with a local loading.

In one or more embodiments, a first zone 30 extends axially from the inlet end 14 of the porous walls 13 a distance less than the full length of the porous wall and a second zone 34 extends axially from the second zone 32 to the outlet end 16 of the porous walls 13.

Reference to a zone that consists essentially of a specified coating, within this application, means only the specified coating was intentionally deposited within the specified zone, and while other components may inadvertently deposit or migrate into the zone, the majority of material in the zone is the specifically deposited material.

Figure 4:
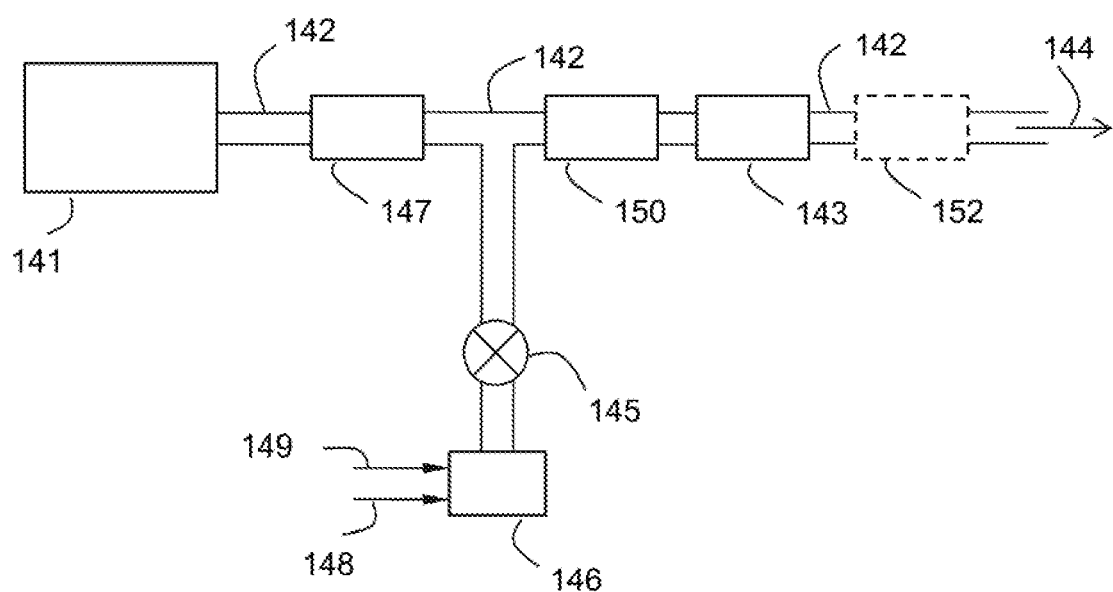
FIG. 4 illustrates an exemplary embodiment of an engine system comprising an emission treatment system, a urea injector, and other engine components.

FIG. 4 illustrates another exemplary embodiment of an engine system comprising an emission treatment system, a urea injector, and other engine components. Component 147 is a catalyst to convert NO to $NO_2$. First SCR catalyst 150 can be disposed downstream from the catalyst component 147 and upstream from a second SCR catalyst 143. As described above, the first SCR catalyst 150 can be on a particulate filter, for example, a wall flow filter. The second SCR catalyst 143 can be on a monolithic, honeycomb flow through substrate or ceramic foam. An optional additional catalyst 152 can be disposed downstream of the second SCR catalyst 143, and may contain an AMOx catalyst and/or a catalyst to oxidize hydrocarbons and carbon monoxide. Alternatively, an AMOx catalyst and/or a catalyst to oxidize hydrocarbons and carbon monoxide can be placed on the outlet end of the second SCR catalyst 143 substrate. Depending on the desired level of ammonia, carbon monoxide and hydrocarbon removal, additional oxidation catalysts can be included. The exhaust containing gaseous pollutants (including unburned hydrocarbons, carbon monoxide and NOx) and particulate matter is conveyed from the engine 141 through a connector 142 to the various components shown in FIG. 4 and, the exhaust gas exits the system via the tailpipe 144.

The system shown in FIG. 4 further shows injection of a reductant, for example urea, which may be injected as a spray via a nozzle (not shown) into the exhaust stream. Aqueous urea shown on one line 148 may serve as the ammonia precursor which can be mixed with air on another line 149 in a mixing station 146. Valve 145 can be used to meter precise amounts of aqueous urea which are converted in the exhaust stream to ammonia. The exhaust stream with the added ammonia is conveyed to the first SCR catalyst 150 for the SCR reaction. An additional injector including line 148, line 149, mixing station 14, and valve 145 can be used to meter urea to the second SCR catalyst 143. The injector shown is an example of one type of system that can be used, and other variants are within the scope of the invention.

EXAMPLES

The disclosed non-limiting examples illustrate an exemplary embodiment of the invention. It is to be understood that the invention is not limited to the recited arrangements, details of construction, or process steps set forth in the following description of the examples, and that the invention is capable of other embodiments and of being practiced or being carried out in various ways.

Example 1

Figure 5:
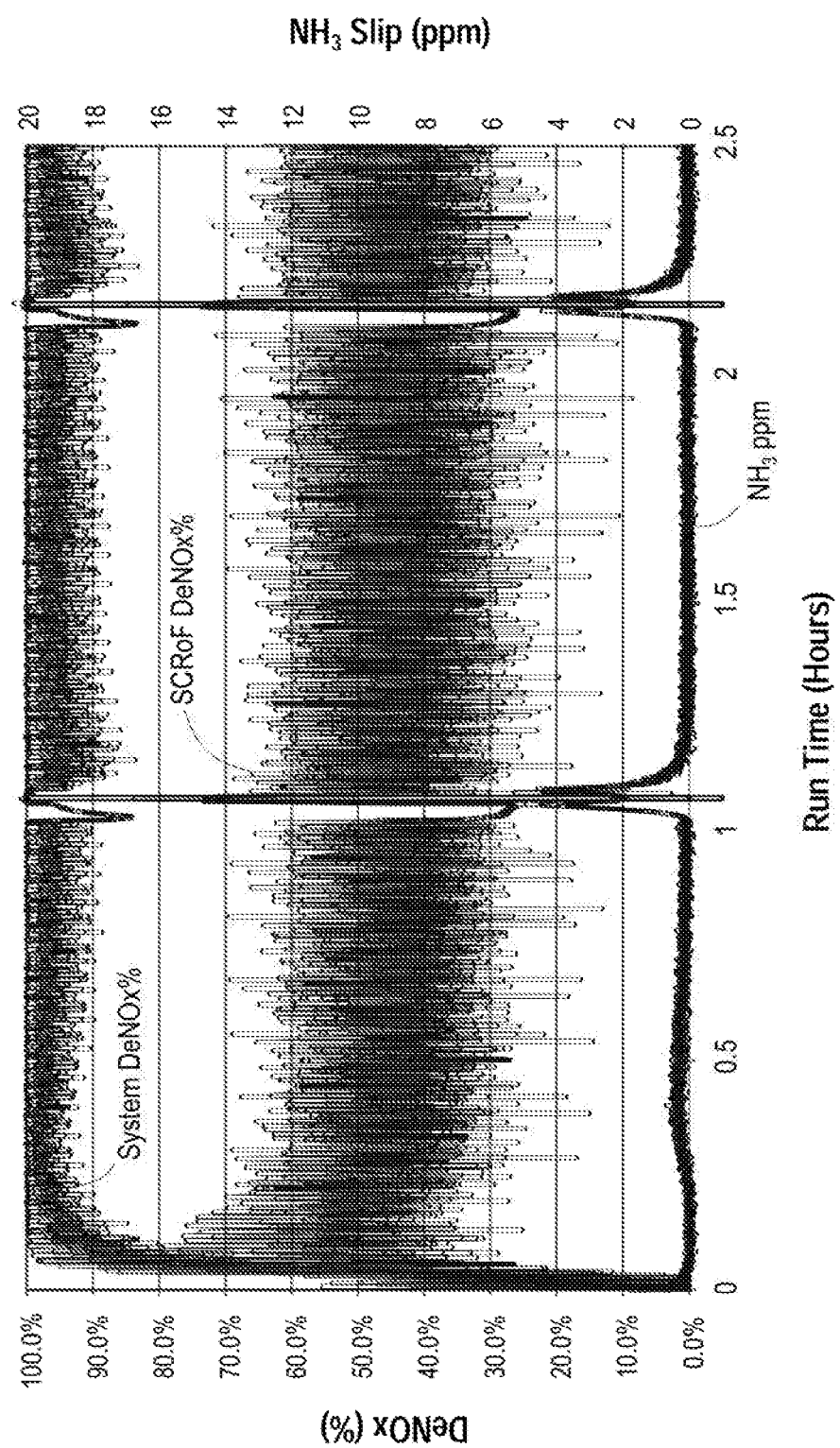
FIG. 5 is a graph showing NOx conversion for the system of Example 1.

A vehicle emission system including a DOC (30 $g/ft^3$) of Pt on a honeycomb flow through substrate, which provided an average $NO_2/NOx$ ratio of approximately 50% over a transient test cycle, a first SCR catalyst on a wall flow filter (SCRoF), and a second SCR catalyst on a flow through substrate was constructed and tested. A SCRoF was placed downstream from the DOC. The SCRoF had a porosity of about 60%. The SCRoF was zone coated such that the rear zone on the outlet end (50% of the axial length of the filter) contained a local loading of 0.2 $g/in^3$ of a Cu zeolite SCR catalyst. An inlet zone (50% of the length of the filter) did not contain any catalyst. The overall loading for the entire SCRoF was 0.1 $g/in^3$. The second SCR catalyst on the flow through substrate was coated with same SCR catalyst as the SCRoF, but at a loading of 3.0 $g/in^3$ along the entire length of the substrate. The system was placed downstream of a heavy duty diesel engine. The engine out NOx was in the range of 300-500 grams/hour and a NOx/Soot ratio in the range of 20:1 to 30:1. The engine was run on a simulated construction vehicle transient cycle at a normalized stoichiometric ratio of $NH_3/NOx$ of 1.0. NOx removal was measured downstream from the first SCR catalyst on the filter and for the overall system. FIG. 5 shows that 50% of the NOx removal occurred on the SCRoF and approximately 45% on the second SCR catalyst for a total removal of 95%, demonstrating that high conversion was achieved across the entire system.

Figure 6:
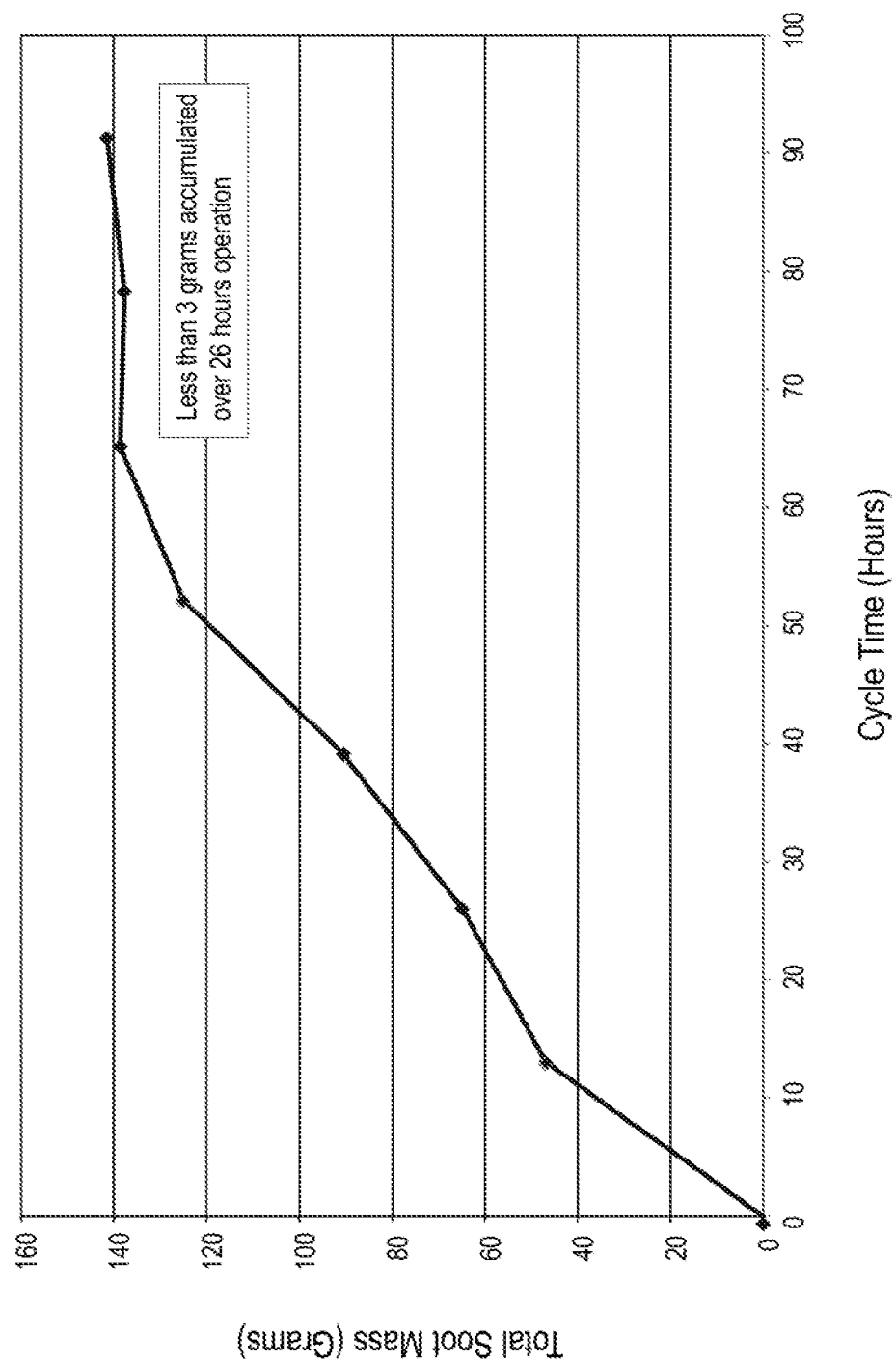
FIG. 6 is a graph showing soot loading versus time for Example 1.

The simulated vehicle cycle was run continuously for approximately 95 hours. The total soot mass accumulated on the particulate filter versus time was measured and shown in FIG. 6. FIG. 6 shows that after approximately 66 hours, a balance was obtained between soot oxidation on the filter and engine out soot emissions.

Comparative Example 2

A second system was constructed, which was identical to the system in Example 1, except the SCRoF was loaded along the entire length of the wall flow filter with the same SCR catalyst as Example 1 at a loading of 1.4 $g/in^3$. The NOx conversion on the SCRoF was approximately 89% and the system NOx conversion was approximately 98%. The total soot mass accumulated was not measured for this sample.

Comparing Example 1 and Comparative Example 2, it has been demonstrated that adjusting the loading and/or location of SCR catalyst on a particulate filter can achieve high NOx conversion and particulate removal in system including a particulate filter containing SCR catalyst and a downstream second SCR catalyst. Specifically, by providing an intentionally low overall loading of 0.1 $g/in^3$ and a zoned loading in which no catalyst was contained on an inlet zone of the SCRoF, the NOx conversion across the filter is intentionally lowered, which allows for adequate soot oxidation and passive regeneration of the filter. The total NOx conversion for the systems exceeds 95%.

Other SCR catalyst characteristics can be modified so that an SCR catalyst on a particulate filter can be designed to limit the NOx conversion on the filter, allowing for passive regeneration on the filter.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A vehicle emission system for removing NOx and particulates from exhaust gas of a lean burn engine, the system comprising:
   a catalyst which oxidizes NO to form $NO_2$;
   a first ammonia selective catalytic reduction (SCR) catalyst disposed on a particulate filter, the first ammonia SCR catalyst comprises a CHA zeolitic framework material promoted with Cu and/or Fe and is loaded at a rear zone of the filter at a loading of 0.2 g/in$^3$ in the rear zone; and
   a second ammonia SCR catalyst downstream from the first ammonia SCR catalyst, wherein the second ammonia SCR catalyst is disposed on a flow through substrate designed to promote SCR of NOx, the loading of the first ammonia SCR catalyst at the rear zone of the particulate filter is lower than a loading of the second ammonia SCR catalyst at the flow through substrate, and the loading of the second ammonia SCR catalyst at the flow through substrate is 3.0 g/in$^3$;
   wherein the system is configured to provide a NOx conversion exceeding 90% and wherein the first ammonia SCR catalyst is configured to limit NOx conversion on the particulate filter to a range of 5-75%, facilitate passive oxidation of soot trapped by the particulate filter by reaction of the soot with unconverted $NO_2$, and allow ammonia slip through the particulate filter to facilitate the SCR of NOx on the second ammonia SCR catalyst.

2. The system of claim 1, wherein limiting NOx conversion and facilitating passive oxidation of soot trapped by the particulate filter comprises retarding the SCR activity on the particulate filter to enable the passive oxidation of soot on the particulate filter.

3. The system of claim 1, wherein the first ammonia SCR catalyst is configured to balance the rate of reaction of particulate combustions by $NO_2$ and rate of SCR reaction based upon NOx and particulate matter exiting the engine, and the second ammonia SCR catalyst is designed to provide additional NOx conversion to meet a targeted total system NOx conversion.

4. The system of claim 1, wherein the first ammonia SCR catalyst and the second ammonia SCR catalyst are the same SCR catalyst.

* * * * *